(12) United States Patent
Dudda et al.

(10) Patent No.: US 11,071,127 B2
(45) Date of Patent: Jul. 20, 2021

(54) SEMI-PERSISTENT TRANSMISSION SCHEDULING

(71) Applicant: Telefonaktiebolaget LM Ericsson (publ), Stockholm (SE)

(72) Inventors: Torsten Dudda, Aachen (DE); Shehzad Ali Ashraf, Aachen (DE); Gustav Wikström, Täby (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 16/346,394

(22) PCT Filed: Nov. 2, 2017

(86) PCT No.: PCT/EP2017/078099
§ 371 (c)(1),
(2) Date: Apr. 30, 2019

(87) PCT Pub. No.: WO2018/083198
PCT Pub. Date: May 11, 2018

(65) Prior Publication Data
US 2020/0092900 A1 Mar. 19, 2020

Related U.S. Application Data (60) Provisional application No. 62/417,370, filed on Nov. 4, 2016.

(51) Int. Cl.
*H04W 72/12* (2009.01)
*H04L 1/18* (2006.01)
(Continued)

(52) U.S. Cl.
CPC ....... *H04W 72/1257* (2013.01); *H04L 1/1819* (2013.01); *H04L 5/0055* (2013.01); *H04W 72/042* (2013.01); *H04W 80/02* (2013.01)

(58) Field of Classification Search
CPC .................. H04L 5/0055; H04W 72/1257
See application file for complete search history.

(56) References Cited

U.S. PATENT DOCUMENTS 8,271,842 B2 * 9/2012 Nagaraja ............... H04L 1/0042
370/216
8,804,848 B2 * 8/2014 Cipolli .................. H04N 19/51
375/240.27
(Continued)

FOREIGN PATENT DOCUMENTS

WO 2013079114 A1 6/2013
WO 2018083201 A1 5/2018

OTHER PUBLICATIONS

Ericsson, "Acknowledgements for SPS Commands", 3GPP TSG-RAN WG2 #94, Nanjing, China, May 23, 2016, pp. 1-3, Tdoc R2-163781, 3GPP.
(Continued)

*Primary Examiner* — Parth Patel
(74) *Attorney, Agent, or Firm* — Christopher & Weisberg, P.A.

(57) ABSTRACT

A transmitting node (110) transmits a message (210) instructing a radio node (105) that data will be transmitted to the radio node (105) according to the same Downlink Control Information (DCI) each period (250). The message (210) includes a duration of the period (250). The transmitting node (110) further transmits the DCI to the radio node (105) for the periodic transmission (260). The radio node (105) receives the message (210) and the DCI from the transmitting node (110), and decodes each of a plurality of transmissions of the periodic transmission (260) according to the DCI.

16 Claims, 7 Drawing Sheets

(51) Int. Cl.
  *H04L 5/00*    (2006.01)
  *H04W 72/04*   (2009.01)
  *H04W 80/02*   (2009.01)

(56) References Cited

U.S. PATENT DOCUMENTS

| | | | |
|---|---|---|---|
| 9,537,612 B2* | 1/2017 | Kodali | H04W 72/042 |
| 9,847,853 B1* | 12/2017 | Patel | H04L 1/1819 |
| 9,867,212 B2* | 1/2018 | Lohr | H04L 1/1607 |
| 10,171,219 B2* | 1/2019 | Fan | H04L 1/0073 |
| 10,602,431 B2* | 3/2020 | Takeda | H04W 48/12 |
| 10,609,728 B2* | 3/2020 | Lee | H04L 1/18 |
| 10,609,729 B2* | 3/2020 | Dudda | H04W 76/38 |
| 10,735,927 B2* | 8/2020 | Sun | H04W 72/1289 |
| 2009/0003282 A1* | 1/2009 | Meylan | H04L 47/10 370/331 |
| 2009/0241002 A1* | 9/2009 | Ko | H04L 1/1893 714/749 |
| 2009/0285141 A1* | 11/2009 | Cai | H04W 52/0251 370/311 |
| 2010/0067468 A1* | 3/2010 | Ho | H04L 1/1812 370/329 |
| 2010/0074231 A1* | 3/2010 | Hsu | H04W 72/1284 370/336 |
| 2010/0081443 A1* | 4/2010 | Meyer | H04W 72/1289 455/450 |
| 2010/0111024 A1* | 5/2010 | Fan | H04L 5/0055 370/329 |
| 2011/0128931 A1* | 6/2011 | Ishii | H04L 1/1854 370/329 |
| 2011/0182245 A1* | 7/2011 | Malkamaki | H04L 1/1812 370/329 |
| 2011/0269490 A1* | 11/2011 | Earnshaw | H04L 1/0026 455/509 |
| 2011/0292895 A1* | 12/2011 | Wager | H04L 5/0007 370/329 |
| 2012/0052899 A1* | 3/2012 | Wang | H04W 52/226 455/513 |
| 2012/0093121 A1* | 4/2012 | Zhang | H04W 72/1284 370/329 |
| 2012/0147810 A1* | 6/2012 | Wang | H04W 24/02 370/315 |
| 2013/0176918 A1* | 7/2013 | Fu | H04B 7/0404 370/280 |
| 2014/0071868 A1* | 3/2014 | Bergquist | H04L 1/1803 370/311 |
| 2014/0086137 A1* | 3/2014 | Chen | H04L 5/0053 370/312 |
| 2014/0092786 A1* | 4/2014 | He | H04B 5/00 370/280 |
| 2015/0109972 A1* | 4/2015 | Khoryaev | H04W 72/0446 370/280 |
| 2015/0124671 A1* | 5/2015 | Tabet | H04W 52/0251 370/311 |
| 2015/0163041 A1* | 6/2015 | Kodali | H04L 1/1812 370/252 |
| 2015/0180623 A1* | 6/2015 | Kim | H04L 5/0055 370/241 |
| 2015/0215909 A1* | 7/2015 | Takeda | H04L 1/1854 370/329 |
| 2015/0282126 A1* | 10/2015 | Park | H04L 5/0091 370/329 |
| 2015/0365831 A1* | 12/2015 | Ko | H04L 5/001 370/329 |
| 2015/0365925 A1* | 12/2015 | Fu | H04W 24/10 370/329 |
| 2016/0100422 A1* | 4/2016 | Papasakellariou | H04L 1/1896 370/329 |
| 2016/0227517 A1* | 8/2016 | Han | H04W 72/04 |
| 2016/0278116 A1* | 9/2016 | Lohr | H04W 72/1289 |
| 2017/0118701 A1* | 4/2017 | Kim | H04W 48/16 |
| 2017/0118792 A1* | 4/2017 | Rico Alvarino | H04W 52/0225 |
| 2017/0181155 A1* | 6/2017 | Chen | H04W 72/0413 |
| 2017/0188391 A1* | 6/2017 | Rajagopal | H04W 74/0816 |
| 2017/0273056 A1* | 9/2017 | Papasakellariou | H04W 52/281 |
| 2017/0289995 A1* | 10/2017 | Lin | H04W 72/12 |
| 2017/0303302 A1* | 10/2017 | Bagheri | H04W 72/1257 |
| 2017/0325277 A1* | 11/2017 | Fujishiro | H04W 24/10 |
| 2017/0332358 A1* | 11/2017 | Park | H04W 72/042 |
| 2018/0048432 A1* | 2/2018 | Sun | H04L 1/1861 |
| 2018/0123767 A1* | 5/2018 | Islam | H04L 1/1864 |
| 2018/0206209 A1* | 7/2018 | Jechoux | H04W 72/02 |
| 2018/0234992 A1* | 8/2018 | Shi | H04W 72/04 |
| 2018/0262945 A1* | 9/2018 | Yl | H04W 76/27 |
| 2018/0294935 A1* | 10/2018 | Uchiyama | H04L 5/0048 |
| 2018/0351705 A1* | 12/2018 | Uchino | H04L 1/08 |
| 2019/0090208 A1* | 3/2019 | Seo | H04L 1/1812 |
| 2019/0090222 A1* | 3/2019 | Wu | H04W 72/042 |
| 2019/0173612 A1* | 6/2019 | Kimura | H04W 56/001 |
| 2019/0181990 A1* | 6/2019 | Yasukawa | H04W 28/04 |
| 2019/0245657 A1* | 8/2019 | Lee | H04L 1/1835 |
| 2019/0289546 A1* | 9/2019 | Cai | H04W 52/0216 |
| 2019/0289580 A1* | 9/2019 | Takeda | H04L 5/0055 |
| 2019/0296863 A1* | 9/2019 | Hu | H04W 72/0446 |
| 2019/0327760 A1* | 10/2019 | Holfeld | H04W 72/04 |
| 2020/0015217 A1* | 1/2020 | Feng | H04W 72/042 |
| 2020/0029352 A1* | 1/2020 | Aiba | H04W 28/0278 |
| 2020/0092900 A1* | 3/2020 | Dudda | H04W 80/02 |

OTHER PUBLICATIONS

Wali, P. et al., "Enhanced-Power Saving Semi-Persistent Scheduler for VoLTE in LTE-Advanced", IEEE Transactions on Wireless Communications, vol. 15 No. 11, Nov. 1, 2016, pp. 7858-7871, IEEE.

Catt, "Feedback for SPS Activation and Deactiviation", 3GPP TSG RAN WG2 Meeting #94, Nanjing, China, May 23, 2016, pp. 1-3, R2-163475, 3GPP.

3rd Generation Partnership Project, "3rd Generation Partnership Project; Technical Specification Group Radio Access Network; Evolved Universal Terrestrial Radio Access (E-UTRA); Medium Access Control (MAC) Potocol Specification (Release 14)", Technical Specification, 3GPP TS 36.321 V14.0.0, Sep. 1, 2016, pp. 1-96, 3GPP.

3rd Generation Partnership Project, "3rd Generation Partnership Project; Technical Specification Group Radio Access Network; Evolved Universal Terrestrial Radio Access (E-UTRA); Radio Resource Control (RRC); Protocol Specification (Release 14)", Technical Specification, 3GPP TS 36.331 V14.0.0, Sep. 1, 2016, pp. 1-644, 3GPP.

3rd Generation Partnership Project, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 14)", Technical Specification, 3GPP TS 36.300 V14.0.0, Sep. 1, 2016, pp. 1-314, 3GPP.

3rd Generation Partnership Project, "3rd Generation Partnership Project; Technical Specification Group Radio Access Network; Evolved Universal Terrestrial Radio Access (E-UTRA); Multiplexing and Channel Coding (Release 14)", Technical Specification, 3GPP TS 36.212 V14.4.0, Sep. 1, 2017, pp. 1-198, 3GPP.

* cited by examiner

SEMI-PERSISTENT TRANSMISSION SCHEDULING

TECHNICAL FIELD

Embodiments of the present disclosure generally relate to semi-persistent scheduling of radio transmissions, and more particularly to control signaling between a transmitting node and a radio node to enable the radio node to decode periodic transmission of data.

BACKGROUND

Many wireless communication systems involve transmission scheduling between wireless nodes. In some such systems, a first node sets the transmission schedule, and other nodes communicating with the first node adhere to the transmission schedule. One example of such a transmission schedule defines when the other nodes may expect the first node to transmit on a downlink. Another example of such a transmission schedule defines when the other nodes are permitted to transmit on an uplink. The first node may inform the other nodes of the transmission scheduling using Downlink Control Information (DCI). One particular example of such DCI may be DCI as defined by the 3GPP standards organization, e.g., according to 3GPP TS 36.212 V14.0.0 (2016 September). Such DCI may include, for example, a resource allocation, modulation and coding scheme, and other information useful for decoding transmissions. Other examples of such DCI may be particular proprietary to the particular wireless technology used for the communication, or may be defined by other standards organizations. By scheduling transmissions, the first node may coordinate communication between the nodes over a shared wireless medium (e.g., a particular time and/or frequency domain of an air interface).

SUMMARY

Some embodiments herein include transmission scheduling in which a transmitting node instructs a radio node that data will be transmitted to the radio node according to the same Downlink Control Information (DCI) each period. The transmitting then transmits the DCI to the radio node for the periodic transmission. Examples of a transmitting node include a base station (e.g., a NodeB, an eNodeB). Examples of a radio node include user equipment (UE) (e.g., a mobile phone, a smartphone, a data modem, a mobile computer, a vehicle, an actuator, a sensor, or any other kind of terminal device). The transmitting node may configure the period of the periodic transmission in the radio node by appropriate signaling by specifying a duration of the period, e.g., in terms of any number of time or transmission units (e.g., milliseconds, seconds, subframes).

Consistent with the above, embodiments herein include a method of transmission scheduling implemented by a transmitting node. The method comprises transmitting a message instructing a radio node that data will be transmitted to the radio node according to the same Downlink Control Information (DCI) each period. The message comprises a duration of the period. The method further comprises transmitting the DCI to the radio node for the periodic transmission.

In some embodiments, the method further comprises switching between dynamic and semi-persistent scheduling modes, transmitting a specific DCI for each data transmission transmitted to the radio node while in the dynamic scheduling mode, and transmitting the message and the DCI for the semi-persistent scheduling mode.

In some embodiments, the duration of the period is an integer number of milliseconds less than 10 milliseconds.

In some embodiments, the method further comprises receiving a Hybrid Automatic Repeat Request (HARQ) acknowledgement (ACK) from the radio node in response to the DCI. In other embodiments, the method further comprises only receiving a HARQ ACK from the radio node in response to transmitting padding data to the radio node according to the DCI in an initial data transmission of the periodic transmission. In yet other embodiments, the method further comprises only receiving a HARQ ACK from the radio node in response to transmitting a particular MAC Control Element to the radio node according to the DCI in an initial data transmission of the periodic transmission. In yet other embodiments, the method further comprises only receiving a HARQ ACK from the radio node in response to transmitting a particular MAC Control Element, separately from the periodic transmission, to the radio node.

In some embodiments, the message further instructs the radio node to deactivate HARQ negative ACK (NACK) transmission without deactivating HARQ ACK transmission.

In some embodiments, the method further comprises only receiving a HARQ NACK from the radio node in response to retransmitting, to the radio node, a previous transmission for which an expected HARQ ACK was not received, wherein the HARQ NACK indicates to the transmitting node that the radio node encountered a decoding error with respect to the retransmitting.

Other embodiments include of transmission scheduling implemented by a radio node. The method comprises receiving a message, from a transmitting node, instructing the radio node that data will be transmitted from the transmitting node to the radio node according to the same Downlink Control Information (DCI) each period. The message comprises a duration of the period. The method further comprises receiving, from the transmitting node, the DCI for the periodic transmission, and decoding each of a plurality of transmissions of the periodic transmission according to the DCI.

In some embodiments, the method further comprises switching between dynamic and semi-persistent scheduling modes, receiving a specific DCI for each data transmission received from the transmitting node while in the dynamic scheduling mode, and receiving the message and the DCI for the semi-persistent scheduling mode.

In some embodiments, the duration of the period is an integer number of milliseconds less than 10 milliseconds.

In some embodiments, the method further comprises transmitting a Hybrid Automatic Repeat Request (HARQ) acknowledgement (ACK) to the transmitting node in response to the DCI. In other embodiments, the method further comprises refraining from transmitting any HARQ ACK to the transmitting node unless padding data is received from the transmitting node according to the DCI in an initial data transmission of the periodic transmission. In yet other embodiments, the method further comprises refraining from transmitting any HARQ ACK to the transmitting node unless a particular MAC Control Element is received from the transmitting node according to the DCI in an initial data transmission of the periodic transmission. In yet other embodiments, the method further comprises refraining from transmitting any HARQ ACK to the transmitting node unless a particular MAC Control Element is received separately from the periodic transmission.

In some embodiments, the method further comprises deactivating HARQ negative ACK (NACK) transmission without deactivating HARQ ACK transmission responsive to receiving the message. In other embodiments, the method further comprises refraining from transmitting any HARQ NACK to the transmitting node unless the radio node encounters a decoding error with respect to a retransmission of a previous data transmission of the periodic transmission, the radio node having encountered a previous decoding error with respect to the previous data transmission.

Embodiments also include apparatus, systems, computer program products, software, and/or carriers that correspond to one or more of the methods described herein.

Note that, as used herein, when a reference numeral comprises a letter designation in the drawings, discussion of a specific instance of an illustrated element will use the appropriate corresponding letter designation (e.g., radio node 105a). However, the letter designation will be omitted in order to refer generically to the illustrated subject matter (e.g., discussion of a radio node 105 (generally), rather than discussion of particular radio nodes 105a, 105b).

DETAILED DESCRIPTION

As will be described in detail below, aspects of the present disclosure may be implemented entirely as hardware units, entirely as software modules (including firmware, resident software, micro-code, etc.), or as a combination of hardware units and software modules. For example, embodiments of the present disclosure may take the form of a non-transitory computer readable medium storing software instructions in the form of a computer program that, when executed on a programmable device, configures the programmable device to execute the various methods described below.

For clarity in understanding the disclosure below, to the extent that "one of" a conjunctive list of items (e.g., "one of A and B") is discussed, the present disclosure refers to one (but not both) of the items in the list (e.g., an A or a B, but not both A and B). Such a phrase does not refer to one of each of the list items (e.g., one A and one B), nor does such a phrase refer to only one of a single item in the list (e.g., only one A, or only one B). Similarly, to the extent that "at least one of" a conjunctive list of items is discussed (and similarly for "one or more of" such a list), the present disclosure refers to any item in the list or any combination of the items in the list (e.g., an A only, a B only, or both an A and a B). Such a phrase does not refer to one or more of each of the items in the list (e.g., one or more of A, and one or more of B).

Figure 1:
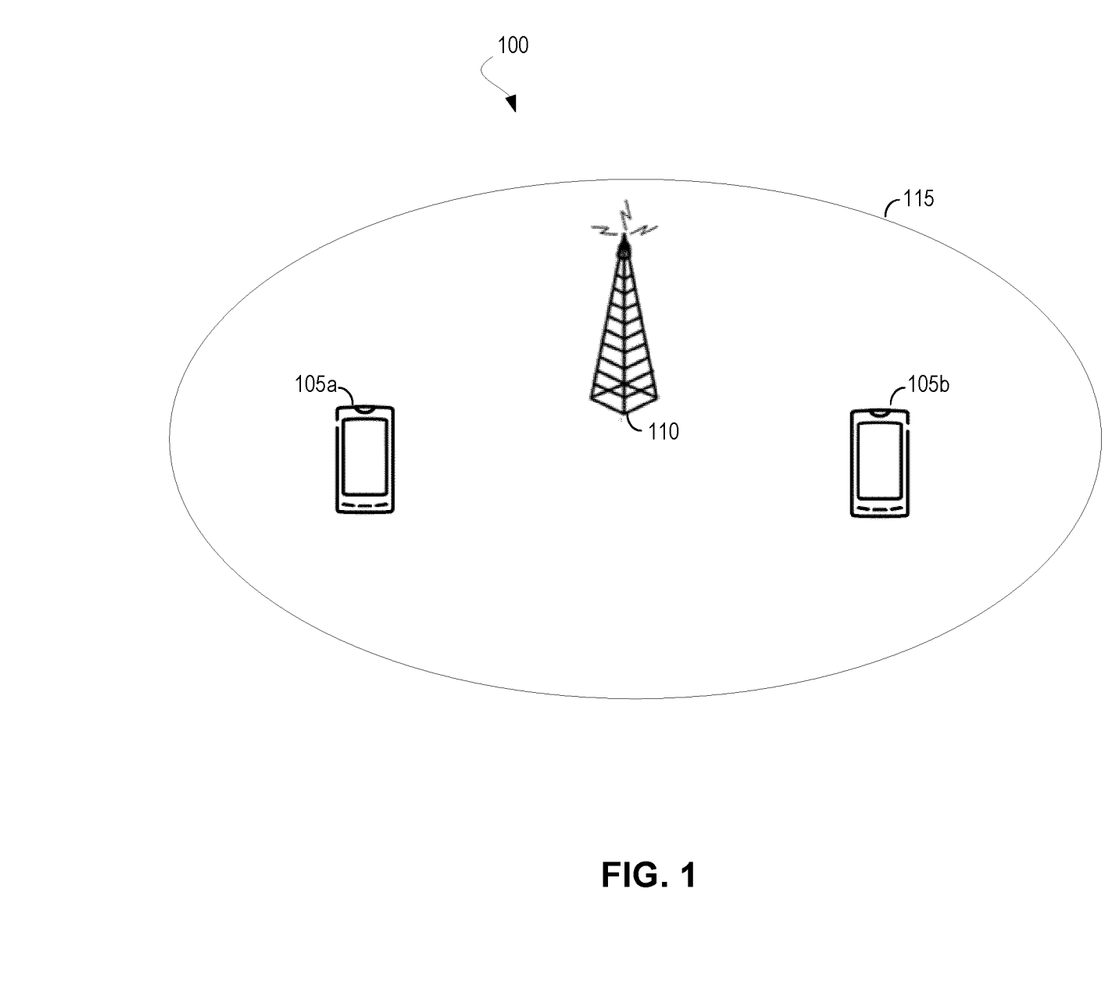
FIG. 1 illustrates an example wireless communication system, according to one or more embodiments of the present disclosure.

Turning now to the drawings, FIG. 1 illustrates an example communication system 100 according to one or more embodiments of the present disclosure. Although the communication system 100 will be described in the context of a Long-Term Evolution (LTE) communication network, the discussion throughout this disclosure may similarly be applied to other wireless communication systems and/or combinations thereof, including but not limited to 5G Next Radio (NR) and/or Wi-Fi.

The communication system 100 comprises a plurality of wireless communication nodes. One of the wireless communication nodes in particular is a transmitting node 110 that serves a cell 115 to radio nodes 105a-b. In the context of LTE, radio nodes 105a-b may each be referred to as a User Equipment (UE), whereas the transmitting node 110 may be a base station (such as an eNodeB), for example. Although only one transmitting node 110 and two radio nodes 105a-b are illustrated in FIG. 1, other examples of the communication system 100 may include any number of transmitting nodes 110, each of which may serve one or more cells 115 to any number of radio nodes 105. Further, although radio nodes 105a-b have been described in the context of UEs, the radio nodes 105 may themselves be base stations (e.g., femtocells, relay base stations), according to other embodiments. Further, transmitting node 110 is itself a type of radio node, in that the transmitting node 110 is a network node capable of radio communication.

Figure 2:
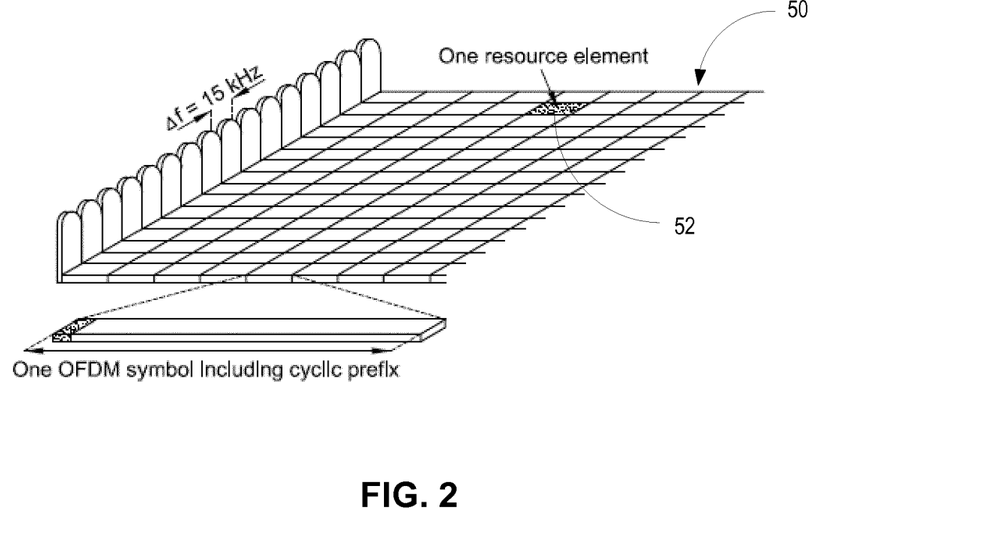
FIG. 2 illustrates an example of downlink physical resources as may be used for Orthogonal Frequency-Division Multiplexing (OFDM) communication, according to one or more embodiments of the present disclosure.

Wireless communication between the transmitting node 110 and each of the radio nodes 105a-b is performed using radio resources across a time and frequency domain. LTE in particular uses OFDM in the downlink and Discrete Fourier Transform (DFT) spread OFDM in the uplink. The basic LTE downlink physical resource can be viewed as a time-frequency grid. FIG. 2 illustrates a portion of an example OFDM time-frequency grid 50 for LTE. Generally speaking, the time-frequency grid 50 is divided into one millisecond subframes. Each subframe includes a number of OFDM symbols. For a normal cyclic prefix (CP) length, suitable for use in situations where multipath dispersion is not expected to be extremely severe, a subframe may comprise fourteen OFDM symbols. A subframe may comprise twelve OFDM symbols if an extended cyclic prefix is used. In the frequency domain, the physical resources shown in FIG. 2 are divided into adjacent subcarriers with a spacing of 15 kHz.

The number of subcarriers may vary according to the allocated system bandwidth. The smallest element of the time-frequency grid 50 is typically referred to as a resource element, which comprises one OFDM subcarrier during one OFDM symbol interval.

Figure 3:
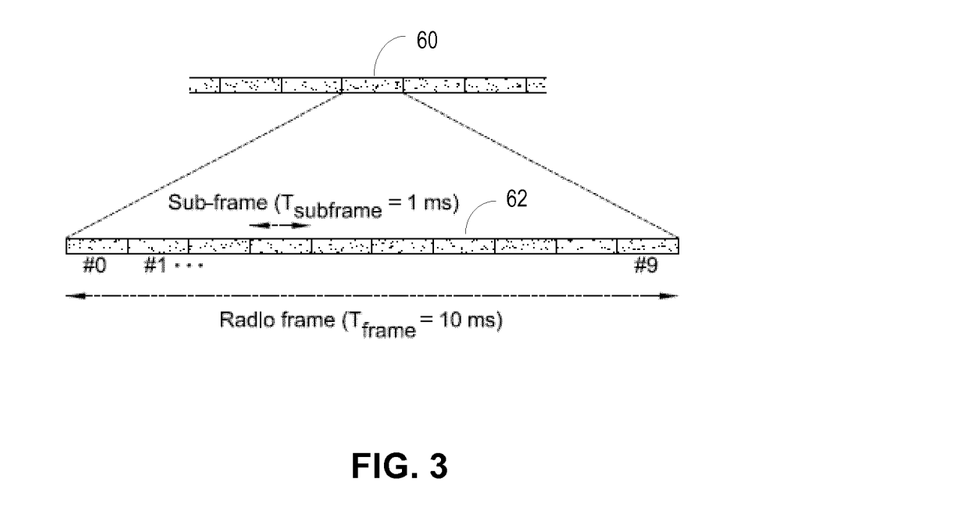
FIG. 3 illustrates an example time-domain structure as may be used for OFDM communication, according to one or more embodiments of the present disclosure.

In LTE systems, data is transmitted to the mobile terminals over a downlink transport channel known as the Physical Downlink Shared Channel (PDSCH). The PDSCH is a time and frequency multiplexed channel shared by a plurality of radio nodes 105. As shown in FIG. 3, the downlink transmissions are typically organized into ten millisecond radio frames 60. Each radio frame typically comprises ten equally-sized subframes 62. For purposes of scheduling users to receive downlink transmissions, the downlink time-frequency resources are allocated in units called resource blocks (RBs). Each resource block typically spans twelve subcarriers (which may be adjacent or distributed across the frequency spectrum) and one 0.5 ms slot (one half of one subframe).

Within a cell 115 the transmitting node 110 may dynamically schedule downlink transmissions to one or more of the radio nodes 105*a-b*, according to one or more embodiments. For such dynamic scheduling, the transmitting node 110 may transmit downlink control information (DCI) in each subframe 62. The DCI identifies one or more radio nodes 105 that have been scheduled to receive data in the current downlink subframe 62 and the resource blocks on which the data is being transmitted to the scheduled radio nodes 105. The DCI is typically transmitted on the Physical Downlink Control Channel (PDCCH) or enhanced PDCCH (ePDCCH), e.g., in the first two, three, or four OFDM symbols in each subframe 62. The resources on which the data is carried is typically transmitted in a corresponding Physical Downlink Shared Channel (PDSCH).

Transmitting node 110 may additionally or alternatively perform semi-persistent scheduling (SPS) of the downlink, according to one or more embodiments. SPS generally requires less signaling overhead than dynamic scheduling. For SPS scheduling, the resource blocks on which data is being transmitted to one or more radio nodes 105 is not identified in DCI transmitted in each subframe 62 (as is the case in dynamic scheduling). Rather, the resource blocks may be identified in DCI transmitted in a particular subframe 62 for multiple subframes (e.g., the present subframe and one or more subsequent subframes). According to one or more embodiments, the multiple subframes may be contiguous or discontiguous. The spacing between subframe occasions to which the DCI applies may, in some embodiments, be a periodicity of the SPS. This SPS period may be expressed in terms of time (e.g., every 10 milliseconds) and/or in terms of subframes (e.g., every tenth subframe). According to embodiments, this period may be adapted by the transmitting node 110, e.g., by appropriate signaling as will be discussed below. Further, this period may be of a duration that is less than, equal to, or greater than the duration of a radio frame 60, according to various embodiments.

The transmitting node 110 may switch between dynamic scheduling and SPS, and may configure one or more radio nodes 105 accordingly. In particular, the transmitting node 110 may transmit Radio Resource Control signaling to indicate that SPS of a particular periodicity is to be used. Thereafter, a resource assignment may be sent in DCI to a radio node 105 to activate SPS. The radio node 110 may store this DCI and expect a downlink transmission at each SPS occasion accordingly.

Figure 4A:
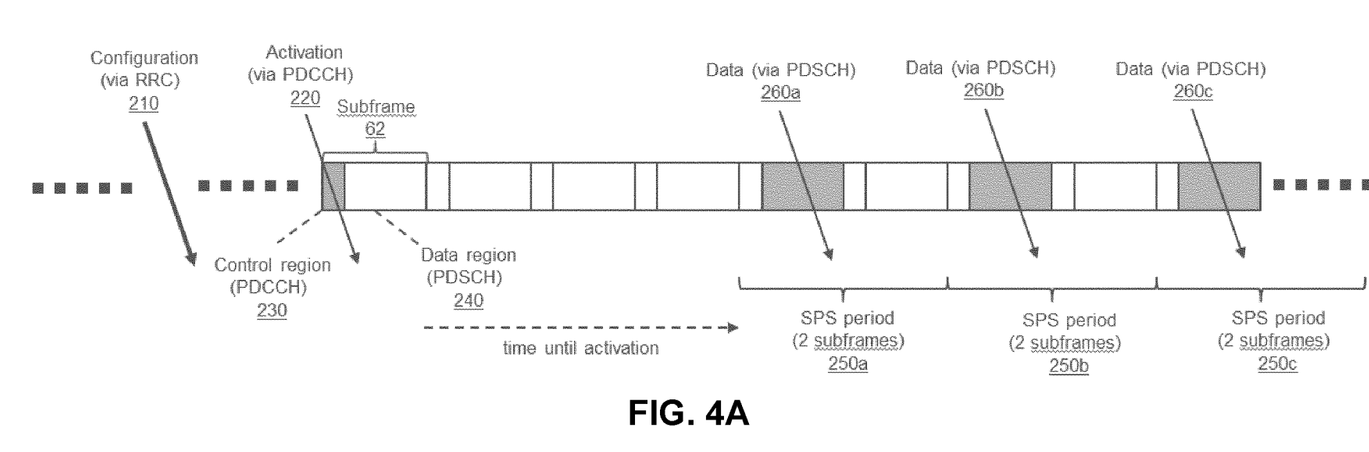
FIG. 4A illustrates an example time-domain structure in which SPS is activated, according to one or more embodiments of the present disclosure.

An example of SPS is illustrated in FIG. 4A. As shown in FIG. 4A, each subframe 62 comprises an initial control region (i.e., a PDCCH) 230 and a subsequent data region 240 (i.e., a PDSCH). In some embodiments, the scheduling may previously have been dynamic (not shown), such that DCI is transmitted in the control region 230 indicates resources of the corresponding data region 240 in which data will be transmitted by the transmitting node 110 to a radio node 105.

The transmitting node 110 may transmit a configuration message 210 via RRC signaling to configure the radio node 105 for SPS. The configuration message 210 indicates a periodicity of the SPS (in this example, two subframes). Later, according to this example, the transmitting node 110 transmits an activation message 220 in the control region 230 of a particular subframe 62 to activate SPS (i.e., as configured by the configuration message 210) at a future time. In this particular example, activation is preconfigured to occur in the fourth subframe 62 after the subframe 62 carrying the activation message 220. In some other examples, the time to activation may be configured by the configuration message 210 or by other signaling. This activation may, in some embodiments, switch the scheduling mode of the radio node 105, e.g., if the radio node 105 was previously configured for dynamic scheduling.

The activation message 220 includes DCI indicating the resources on which data will be transmitted to the radio node 105 periodically in the relevant subframes. The transmitting node 110 then transmits data 260*a* in the data region 240 of the fourth subframe 62 after the subframe 62 carrying the activation message 220 (which is the first subframe 62 in the initial SPS period 250*a*), and continues transmitting data 260*b*, 260*c* in every SPS period 250*b*, 250*c* of two subframes thereafter (as configured by the configuration message 210).

Although some embodiments may use separate configuration and activation messages 210, 220 to configure and activate the radio node 105 for SPS, respectively, other embodiments may use a single message to both configure and activate SPS in the radio node. In an example of such an embodiment, the single message to configure and activate SPS may include DCI identifying the resources on which data will be transmitted, and a duration between instances of subframes carrying such resources (i.e., a periodicity of the SPS).

Further, the configuration and/or activation message 210, 220 may be transmitted using different channels and/or signaling according to other embodiments. For example, the configuration and/or activation message 210, 220 may be transmitted using a Medium Access Control (MAC) Control Element, e.g., in a PDSCH transmission.

In view of the above, embodiments include switching from dynamic scheduling to SPS. Other embodiments include switching from SPS to dynamic scheduling. Such embodiments may similarly include a configuration and/or activation message 210, 220 for the dynamic scheduling. Thus, embodiments include a transmitting node 110 and radio node 105 that may switch scheduling modes freely between dynamic scheduling and SPS, e.g., responsive to conditions in the radio environment, mobility of the radio nodes 105, and/or other factors. In some embodiments, the ability to freely switch between scheduling modes may allow the transmitting node 110 to reduce signaling overhead to more efficiently use transmission resources during high traffic times by switching to SPS, and allow the transmitting node 110 to use a more flexible scheduling mechanism during lower traffic times by switching to dynamic scheduling. Other embodiments include activating, or switching between, SPS and/or dynamic scheduling for other reasons.

Further, although the example of FIG. 4A illustrates an SPS period 250 of two subframes, other embodiments include SPS periods 250 of other durations. For example, particular radio nodes 105 may have very low latency requirements. Such radio nodes 105 may be devices participating in Critical Machine Type Communication (CMTC), for example. Such a system may, for example, have an SPS period 250 of less than two subframes. Less critical systems may have an SPS period 250 of more than two subframes but less than 10 milliseconds (i.e., less than one typical LTE radio frame 60). Systems that involve very infrequent and/or low priority communication, for example, may have SPS periods 250 of more than ten subframes. The SPS period specified by the transmitting node 110 may be dependent upon the particular system, devices, and/or conditions that are present.

Further still, although the example of FIG. 4A illustrates an activation message 220 in which DCI is used for multiple transmissions of data 260a-c according to the configured SPS period, in some embodiments, this DCI may be replaced, e.g., without changing when data transmissions 260 are expected to occur. In one such example, the transmitting node 110 may transmit a replacement DCI to the radio node 105 in the control region 230 of the first subframe 62 of SPS period 250c, and the immediately subsequent data region 240 in SPS period 250c, previously configured for SPS by configuration message 210, would carry data according to the replacement DCI.

According to various embodiments, the radio node 105 may provide Hybrid Automatic Request (HARQ) feedback to the transmitting node 110, according to one or more embodiments. In particular, a radio node 105 may provide HARQ acknowledgements (ACKs) in response to messages that are received and successfully decoded, and negative acknowledgements (NACKs) in response to messages that are either expected and not received, or are received and not successfully decoded. Thus, a radio node 105 may generate and transmit HARQ feedback to the transmitting node 110 depending on the outcome of decoding each periodic SPS data transmission 260, in some embodiments. The radio node 105 may similarly respond to DCI addressed to the radio node 105 with such HARQ feedback, according to one or more embodiments.

As previously discussed, SPS generally requires less signaling overhead than dynamic scheduling. Thus, SPS may be used when less signaling overhead is required or advantageous. According to some embodiments, particular HARQ feedback from the radio node 105 to the transmitting node 110 may be disabled and/or limited, e.g., to reduce signaling overhead when SPS is used. For example, the configuration and/or activation message 210, 220 may instruct the radio node 105 to deactivate HARQ NACK transmission (i.e., without deactivating HARQ ACK transmission).

For example, while the radio node 105 may be required to send a HARQ NACK after failing to decode a data region 240 while in dynamic scheduling mode, such a NACK may only be useful to the transmitting node 110 to distinguish between situations in which the corresponding DCI is not received and situations in which the data region 240 is not decodable. Since DCI is not transmitted in each subframe according to SPS, the transmitting node 110 may consider the absence of an expected HARQ ACK from radio node 105 to indicate that a decoding error has occurred. Accordingly, in some embodiments, the radio node 105 does not transmit a HARQ NACK in response to a data region 240 decoding error, and does transmit a HARQ ACK in response to successfully decoding the data region 240, for each of the SPS periodic transmissions 260.

Figure 4B:
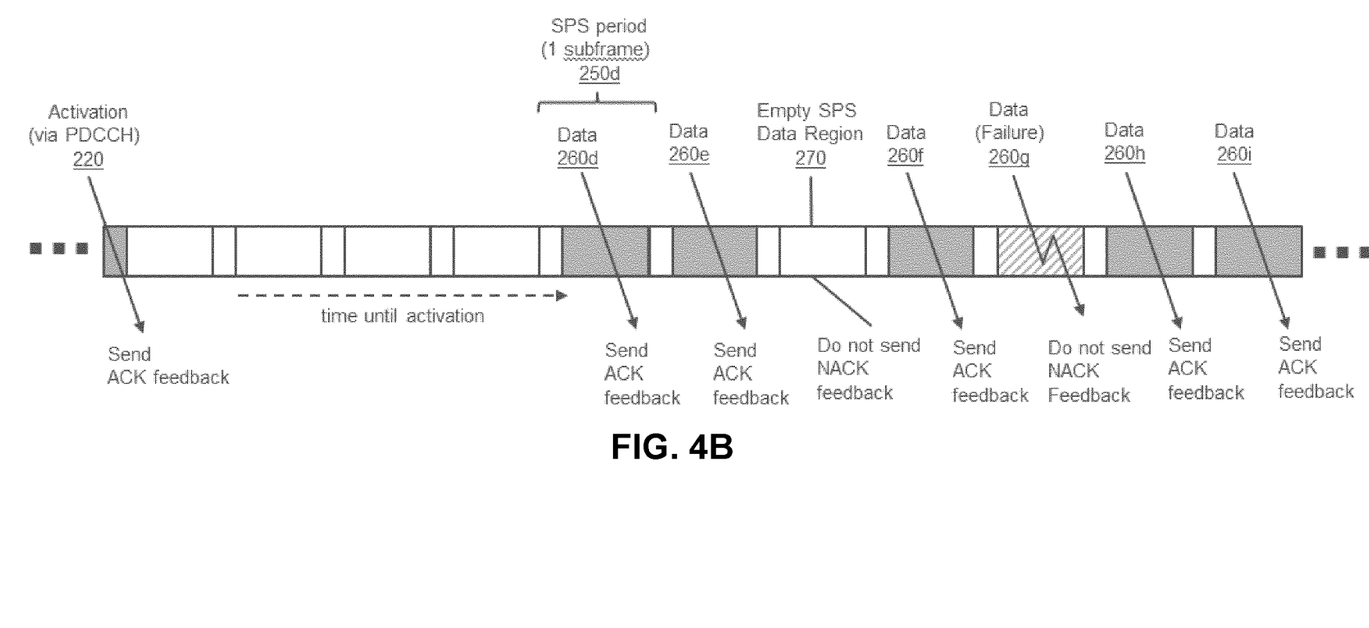
FIG. 4B illustrates an example HARQ feedback scheme as applied to another example time-domain structure in which SPS is activated, according to one or more embodiments of the present disclosure.

An example in which HARQ NACK transmission is deactivated is illustrated in FIG. 4B. According to the example of FIG. 4B, SPS activates four subframes after activation message 220. In this example, the SPS period 250d was previously configured (e.g., by a configuration message 210) with a duration of one subframe. In this example, beginning with the initial one subframe SPS period 250d, the transmitting node 110 begins periodically transmitting data 260d-e each subframe. The radio node 105 successfully receives these data transmissions 260d-e, and sends HARQ ACK feedback accordingly.

Although the next subframe after data transmission 260e is also configured for data transmission, the transmitting node 110 may not have any data to send to the radio node 105 at that time. Accordingly, the transmitting node 110 does not transmit data in the next subframe, resulting in an empty SPS data region 270. As previously mentioned, the radio node 105 has been configured to deactivate HARQ NACK transmission. Accordingly, the radio node 105 does not send a HARQ NACK to the transmitting node 110 in response to the empty SPS data region 270. The transmitting node 110, in this case, expects not to receive HARQ feedback. Accordingly, the transmitting node 110 proceeds to transmit further data 260f in the next SPS period 250.

The radio node 105 subsequently experiences a decoding error when attempting to decode data transmission 260g from the transmitting node 110, according to this example. Again, HARQ NACK transmission is disabled for the radio node 105. Accordingly, the radio node 105 again does not transmit HARQ NACK feedback. The transmitting node 110 expects to receive a HARQ ACK in response to data transmission 260g. Having failed to receive the expected HARQ ACK, the transmitting node 110 retransmits data transmission 260g as data transmission 260h. The radio node 105 successfully decodes the retransmission 260h, and transmits a HARQ ACK to the transmitting node 110 in response. The transmitting node 110, having received the expected HARQ ACK this time, proceeds to send new data in data transmission 260i, which the radio node 105 correspondingly acknowledges after successful decoding thereof.

Although FIG. 4B illustrates an example in which HARQ NACK transmission is deactivated (while HARQ ACK transmission remains active), other embodiments may instruct the radio node 105 to deactivate HARQ ACK transmission (i.e., without deactivating HARQ NACK transmission). Yet other embodiments may instruct the radio node 105 to deactivate both HARQ ACK and HARQ NACK transmission.

Other embodiments may limit NACK transmission to particular situations. According to such other embodiments, the radio node 105 may only send a HARQ NACK in response to encountering multiple decoding failures. For example, in some embodiments, the radio node 105 may only transmit a HARQ NACK in response to a retransmission of a previous transmission for which a decoding error was encountered. In one such example, the radio node 105 may encounter a decoding error when decoding initial SPS data transmission 260a and silently discard this SPS data transmission 260a (i.e., without transmitting a HARQ ACK to the transmitting node 110 in response). The transmitting node 110, expecting (and failing) to receive this HARQ ACK may retransmit data transmission 260a as data transmission 260b. The radio node 105, again encountering a decoding error (this time when attempting to decode the retransmission), may then transmit a HARQ NACK to the transmitting node 110.

Further embodiments may limit HARQ ACK transmission during SPS. For example, in some embodiments, the radio node 105 may transmit a HARQ ACK only when the radio node 105 receives padding data in an SPS data transmission 260a of an initial SPS period 250a. In other embodiments, the radio node 105 may transmit a HARQ ACK only when the radio node 105 receives a particular MAC Control Element in an SPS data transmission 260a of an initial SPS period 250a according to the DCI in the activation message 220. The MAC Control Element may be any one of the MAC Control Elements as described in 3GPP TS 36.321 V14.0.0 (2016 September), for example. In yet other embodiments, the radio node 105 may transmit a HARQ ACK only when the radio node 105 receives a particular MAC Control Element separately from the SPS periodic data transmissions 260.

As touched upon earlier, the transmissions of the transmitting node 110 may be received by multiple radio nodes 105a, 105b. As such, signaling in the control region 230 signaling may be used to indicate which of the radio nodes 105a, 105b the corresponding data region 240 is intended for. According to dynamic signaling, each control region 230 may include an identifier of the radio node 205 (e.g., a Radio Network Temporary Identifier (RNTI)) which notifies the radio node to decode the corresponding data region 240. As applied to SPS, the configuration message 210 may include such an RNTI transmitted via RRC signaling to radio node 105a, and the DCI (indicating the SPS resources) may be transmitted in the activation message 220 (e.g., on a PDCCH) addressed to radio node 105a using the RNTI.

In some particular, embodiments, radio nodes 105a-b may each only receive data very infrequently. Thus, the likelihood that the transmitting node 110 will have data to transmit to either radio node 105a-b may be quite low. Far less likely may be the probability of the transmitting node having data to transmit to both of the radio nodes 105a-b. In order to efficiently utilize data channel resources while still using SPS to keep signaling overhead and latency low, the transmitting node 110 may, in some particular embodiments, allocate the same resource to more than one radio node 105.

For example, the transmitting node 110 may, in some embodiments, transmit a first DCI to radio node 105a, and a different DCI to radio node 105b. In this example, the two DCI both allocate at least one same resource, and each allocates at least one different resource from the other. Thus, the DCI to radio node 105a, and the different DCI to radio node 105b partially, but not completely, overlap with respect to the resources that they each identify. In such embodiments, the transmitting node 110 may transmit additional information that enables each radio node 105a-b to successfully decode the corresponding data region 240 when that data region 240 is intended for that radio node 105a-b.

In some embodiments, the transmitting node 110 transmits a cyclic redundancy check (CRC) code that is computed according to the DCI or the different DCI based on whether the data transmitted on the at least one same resource is intended for the radio node 105a or the other radio node 105b. Since the different DCIs each allocate at least one different resource from the other, when each of the radio nodes 105a-b performs a CRC check based on the data carried by the resources specified in their respective DCI, the CRC will generally check for the radio node 105 for which the data on the shared resource is intended, whereas any other radio nodes 105 (for which the shared resource data is not intended) will encounter a decoding error.

According to other embodiments, the transmitting node 110 sends the same DCI to multiple radio nodes 105a-b. In some such embodiments, the transmitting node 110 may encode a CRC code for a data transmission 260 using an identifier of the radio node to which the data transmission 260 is intended. An example of such an identifier may be, for example, an RNTI that the transmitting node previously transmitted to the intended radio node 105a in a previous SPS configuration message 210. Accordingly, each radio node 105a-b may receive a scrambled CRC code, which must be descrambled using that radio node's identifier before attempting to perform a CRC check. The CRC code will generally check for the intended radio node 105a, whereas any other radio nodes 105b will encounter a decoding error. In some embodiments, the scrambled CRC code is transmitted by the transmitting node 110 in an abbreviated DCI in the control region 230 corresponding to the data transmission 260.

Other embodiments applying a similar approach may alternatively scramble the data transmission 260 itself (rather than the CRC code) with the identifier of the intended radio node 105. Such embodiments may achieve a similar result (i.e., the CRC code may generally check for the intended radio node 105a, but not others).

Figure 5:
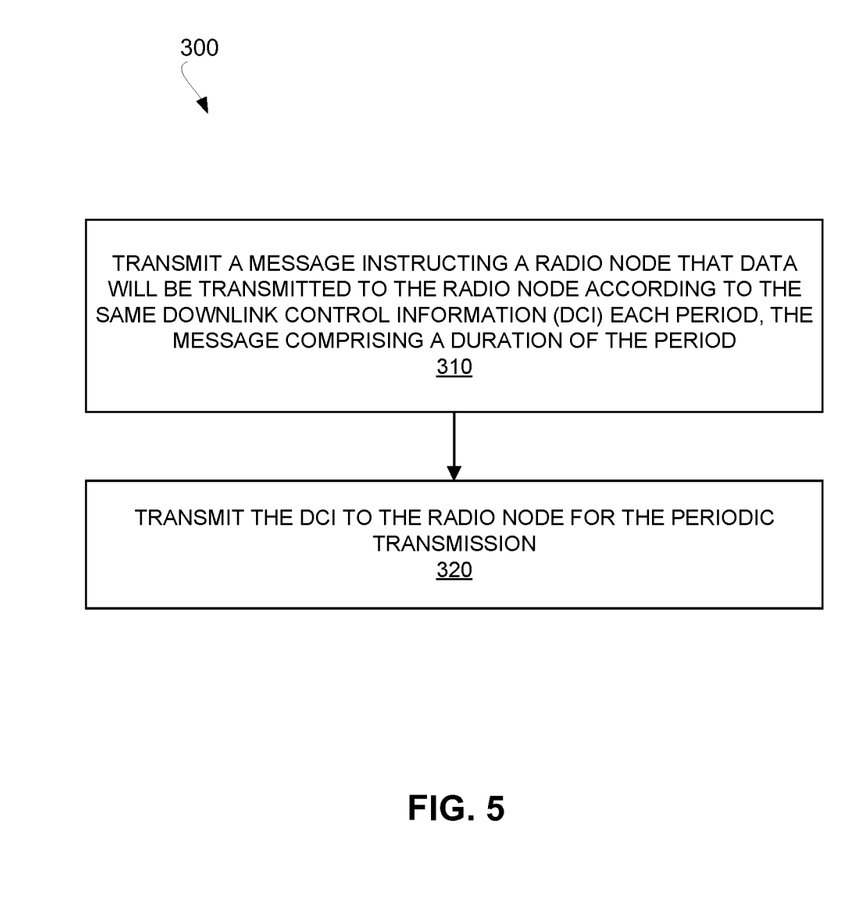
FIG. 5 illustrates an example method implemented by a transmitting node, according to one or more embodiments of the present disclosure.

In view of the above, embodiments of the present disclosure include the example method 300 of transmission scheduling illustrated in FIG. 5. The method 300 may be implemented by a transmitting node 110 and comprises transmitting a message 210 instructing a radio node 105 that data will be transmitted to the radio node 105 according to the same Downlink Control Information (DCI) each period 250, the message comprising a duration of the period (block 310). The method 300 further comprises transmitting the DCI to the radio node 105 for the periodic transmission 260 (block 320).

Figure 6:
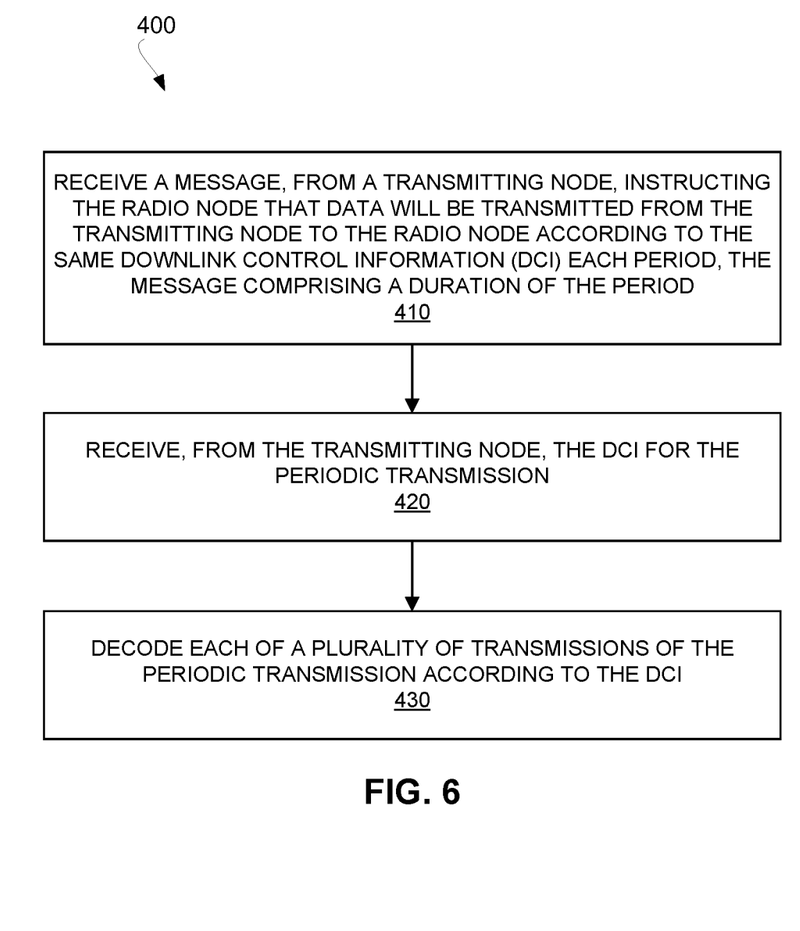
FIG. 6 illustrates an example method implemented by a radio node, according to one or more embodiments of the present disclosure.

Other embodiments of the present disclosure include the example method 400 of transmission scheduling illustrated in FIG. 6. The method 400 may be implemented by a radio node 105 and comprises receiving a message 210, from a transmitting node 110, instructing the radio node 105 that data will be transmitted from the transmitting node 110 to the radio node 105 according to the same Downlink Control Information (DCI) each period 250, the message 210 comprising a duration of the period 250 (block 410). The method 400 further comprises receiving, from the transmitting node 110, the DCI for the periodic transmission 260 (block 420), and decoding each of a plurality of transmissions of the periodic transmission 260 according to the DCI (block 430).

Note that a transmitting node 110 and/or radio node 105 as described above may perform the methods described herein (and any other processing herein) by implementing any functional means, units, or modules. In one embodiment, for example, the transmitting node 110 comprises respective circuits or circuitry configured to perform the steps of method 300 shown in FIG. 5. In another embodiment, for example, the radio node 105 comprises respective circuits or circuitry configured to perform the steps of method 400 shown in FIG. 6. The circuits or circuitry in this regard may comprise circuits dedicated to performing certain functional processing and/or may comprise one or more microprocessors in conjunction with memory. In embodiments that employ memory, which may comprise one or several types of memory such as read-only memory (ROM), random-access memory, cache memory, flash memory devices, optical storage devices, etc., the memory may store program code that, when executed by the one or more processors, carries out the techniques described herein.

Figure 7:
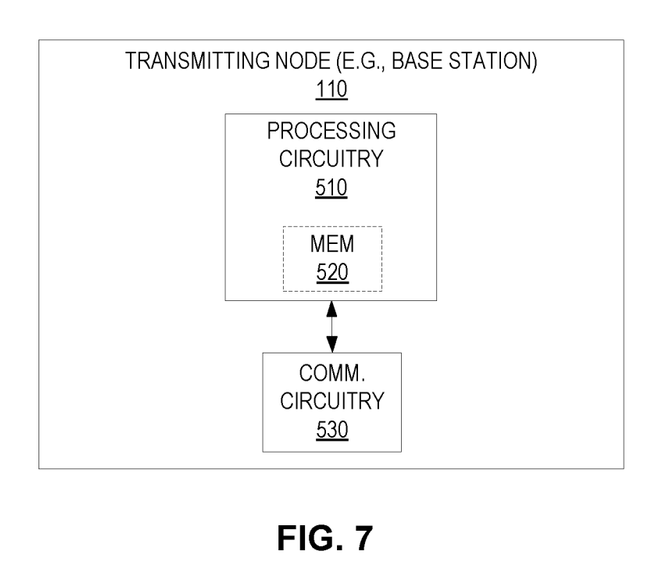
FIG. 7 is a block diagram illustrating example hardware of a transmitting node useful for implementing one or more of the methods described herein, according to one or more embodiments of the present disclosure.

FIG. 7 illustrates an example transmitting node 110, implemented in accordance with one or more embodiments. As shown, the transmitting node 110 includes processing circuitry 510 and communication circuitry 530. The communication circuitry 530 is configured to transmit and/or receive information to and/or from one or more other nodes, e.g., via any communication technology. Such communication may occur via one or more antennas that are either internal or external to the transmitting node 110. The processing circuitry 510 is configured to perform processing described above, e.g., in FIG. 5, such as by executing instructions stored in memory 520. The processing circuitry 510 in this regard may implement certain functional means, units, or modules.

Figure 8:
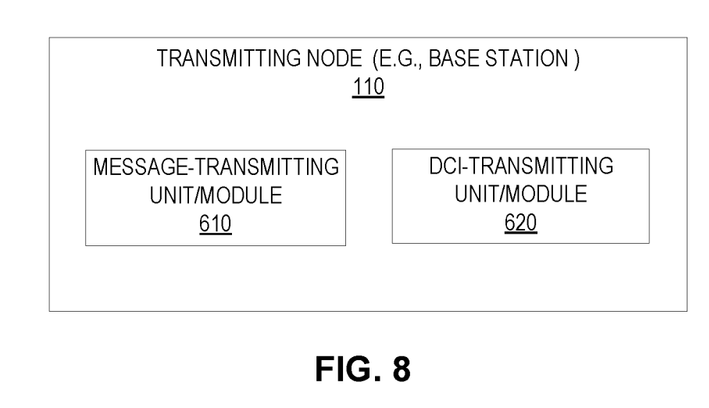
FIG. 8 is a block diagram illustrating example means, physical units, or software modules of a transmitting node useful for implementing one or more of the methods described herein, according to one or more embodiments of the present disclosure.

FIG. 8 illustrates an example transmitting node 110, implemented in accordance with one or more other embodiments. As shown, the transmitting node 110 implements various functional means, units, or modules, e.g., via the processing circuitry 510 in FIG. 7 and/or via software code. These functional means, units, or modules, e.g., for implementing the method 300 in FIG. 5, include for instance a message-transmitting unit or module 610 for transmitting a message 210 instructing a radio node 105 that data 260a-c will be transmitted to the radio node 105 according to the same Downlink Control Information (DCI) each period 250a-c, the message 210 comprising a duration of the period. Also included is a DCI-transmitting unit or module 620 for transmitting, to the radio node 105, the DCI for the periodic transmission 260a-c.

Figure 9:
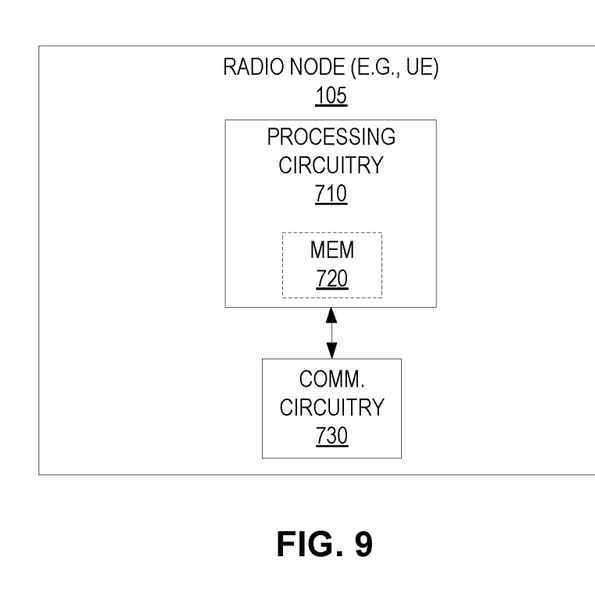
FIG. 9 is a block diagram illustrating example hardware of a radio node useful for implementing one or more of the methods described herein, according to one or more embodiments of the present disclosure.

FIG. 9 illustrates an example radio node 105, implemented in accordance with one or more embodiments. As shown, the radio node 105 includes processing circuitry 710 and communication circuitry 730. The communication circuitry 730 is configured to transmit and/or receive information to and/or from one or more other nodes, e.g., via any communication technology. Such communication may occur via one or more antennas that are either internal or external to the radio node 105. The processing circuitry 710 is configured to perform processing described above, e.g., in FIG. 6, such as by executing instructions stored in memory 720. The processing circuitry 710 in this regard may implement certain functional means, units, or modules.

Figure 10:
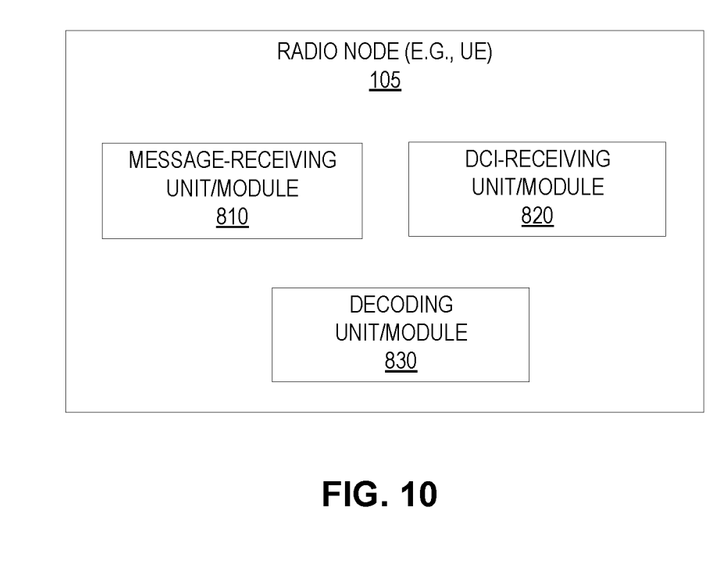
FIG. 10 is a block diagram illustrating example means, physical units, or software modules of a radio node useful for implementing one or more of the methods described herein, according to one or more embodiments of the present disclosure.

FIG. 10 illustrates an example radio node 105, implemented in accordance with one or more other embodiments. As shown, the radio node 105 implements various functional means, units, or modules, e.g., via the processing circuitry 710 in FIG. 9 and/or via software code. These functional means, units, or modules, e.g., for implementing the method 400 in FIG. 6, include for instance a message-receiving unit or module 810 for receiving a message 210, from a transmitting node 110, instructing the radio node 105 that data 260a-c will be transmitted from the transmitting node 110 to the radio node 105 according to the same Downlink Control Information (DCI) each period 250a-c, the message 210 comprising a duration of the period. Also included is a DCI-receiving unit or module 820 for receiving, from the transmitting node 110, the DCI for the periodic transmission 260a-c. Also included is a decoding unit or module 830 for decoding each of a plurality of transmissions of the periodic transmission 260a-c according to the DCI.

Those skilled in the art will also appreciate that embodiments herein further include methods and devices that initiate any of the methods described above, e.g., via one or more corresponding control commands issued over an appropriate signaling medium.

Those skilled in the art will also appreciate that embodiments herein further include corresponding computer programs.

Embodiments further include a computer program that comprises instructions which, when executed on at least one processor of a transmitting node 110 or radio node 105, cause the transmitting node 110 or radio node 105 to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of a transmitting node 110 or radio node 105, cause the transmitting node 110 or radio node 105 to perform as described above.

Embodiments further include a computer program product comprising program code portions for performing the steps of any of the embodiments herein when the computer program product is executed by a transmitting node 110 or radio node 105. This computer program product may be stored on a computer readable recording medium.

The present disclosure may be carried out in other ways than those specifically set forth herein without departing from the essential characteristics thereof. For example, additional physical units or software modules may be included in the various embodiments to perform any of the additional functions discussed above. The present embodiments are to be considered in all respects as illustrative and not restrictive, and all changes coming within the meaning and equivalency range of the appended claims are intended to be embraced therein.

The invention claimed is:

1. A method of transmission scheduling implemented by a transmitting node, the method comprising the transmitting node:
   transmitting a message instructing a radio node that data will be transmitted to the radio node according to the same Downlink Control Information (DCI) each period, the message comprising a duration of the period;
   transmitting the DCI to the radio node for the periodic transmission;
   only receiving a Hybrid Automatic Repeat Request (HARQ) acknowledgement (ACK) from the radio node in response to transmitting padding data to the radio node according to the DCI in an initial data transmission of the periodic transmission or in response to transmitting a particular Medium Access Control (MAC) Control Element to the radio node according to the DCI in the initial data transmission of the periodic transmission; and
   only receiving a HARQ Negative Acknowledgement (NACK) from the radio node in response to retransmitting, to the radio node, a previous transmission for which an expected HARQ ACK was not received and for which a HARQ NACK was not received, wherein the HARQ NACK indicates to the transmitting node that the radio node encountered a decoding error with respect to the retransmitting.

2. The method of claim 1, further comprising:
switching between dynamic and semi-persistent scheduling modes;
transmitting a specific DCI for each data transmission transmitted to the radio node while in the dynamic scheduling mode; and
transmitting the message and the DCI for the semi-persistent scheduling mode.

3. The method of claim 1, wherein the duration of the period is an integer number of milliseconds less than 10 milliseconds.

4. The method of claim 1, wherein the message further instructs the radio node to deactivate HARQ Negative Acknowledgement (NACK) transmission without deactivating HARQ transmission.

5. A transmitting node, comprising:
processing circuitry;
memory containing instructions executable by the processing circuitry whereby the transmitting node is operative to:
transmit a message instructing a radio node that data will be transmitted to the radio node according to the same Downlink Control Information (DCI) each period, the message comprising a duration of the period;
transmit, to the radio node, the DCI for the periodic transmission; and
only receive a Hybrid Automatic Repeat Request (HARQ) acknowledgement (ACK) from the radio node in response to transmitting padding data to the radio node according to the DCI in an initial data transmission of the periodic transmission or in response to transmitting a particular Medium Access Control (MAC) Control Element to the radio node according to the DCI in the initial data transmission of the periodic transmission; and
only receiving a HARQ Negative Acknowledgement (NACK) from the radio node in response to retransmitting, to the radio node, a previous transmission for which an expected HARQ ACK was not received and for which a HARQ NACK was not received, wherein the HARQ NACK indicates to the transmitting node that the radio node encountered a decoding error with respect to the retransmitting.

6. The transmitting node of claim 5, wherein the memory contains further instructions executable by the processing circuitry whereby the transmitting node is further operative to:
switch between dynamic and semi-persistent scheduling modes;
transmit a specific DCI for each data transmission transmitted to the radio node while in the dynamic scheduling mode; and
transmit the message and the DCI for the semi-persistent scheduling mode.

7. The transmitting node of claim 5, wherein the duration of the period is an integer number of milliseconds less than 10 milliseconds.

8. The transmitting node of claim 5, wherein the message further instructs the radio node to deactivate HARQ Negative Acknowledgement (NACK) transmission without deactivating HARQ ACK transmission.

9. A method of transmission scheduling implemented by a radio node, the method comprising the radio node:
receiving a message, from a transmitting node, instructing the radio node that data will be transmitted from the transmitting node to the radio node according to the same Downlink Control Information (DCI) each period, the message comprising a duration of the period;
receiving, from the transmitting node, the DCI for the periodic transmission; and decoding each of a plurality of transmissions of the periodic transmission according to the DCI;
refraining from transmitting any Hybrid Automatic Repeat Request (HARQ) acknowledgement (ACK) to the transmitting node unless padding data is received from the transmitting node according to the DCI in an initial data transmission of the periodic transmission or a unless a particular Medium Access Control (MAC) Control Element is received from the transmitting node according to the DCI in the initial data transmission of the periodic transmission; and
refraining from transmitting any HARQ Negative Acknowledgement (NACK) to the transmitting node unless the radio node encounters a decoding error with respect to a retransmission of a previous data transmission of the periodic transmission, the radio node having encountered a previous decoding error with respect to the previous data transmission.

10. The method of claim 9, further comprising:
switching between dynamic and semi-persistent scheduling modes;
receiving a specific DCI for each data transmission received from the transmitting node while in the dynamic scheduling mode; and
receiving the message and the DCI for the semi-persistent scheduling mode.

11. The method of claim 9, wherein the duration of the period is an integer number of milliseconds less than 10 milliseconds.

12. The method of claim 9, further comprising HARQ Negative Acknowledgement (NACK) transmission without deactivating HARQ ACK transmission responsive to receiving the message.

13. A radio node, comprising:
processing circuitry;
memory containing instructions executable by the processing circuitry whereby the radio node is operative to:
receive a message, from a transmitting node, instructing the radio node that data will be transmitted from the transmitting node to the radio node according to the same Downlink Control Information (DCI) each period, the message comprising a duration of the period;
receive, from the transmitting node, the DCI for the periodic transmission; and decode each of a plurality of transmissions of the periodic transmission according to the DCI; and
refrain from transmitting any Hybrid Automatic Repeat Request (HARQ) acknowledgement (ACK) to the transmitting node unless padding data is received from the transmitting node according to the DCI in an initial data transmission of the periodic transmission or a unless a particular Medium Access Control (MAC) Control Element is received from the transmitting node according to the DCI in the initial data transmission of the periodic transmission; and
refrain from transmitting any HARQ Negative Acknowledgement (NACK) to the transmitting node unless the radio node encounters a decoding error with respect to a retransmission of a previous data transmission of the periodic transmission, the radio node having encountered a previous decoding error with respect to the previous data transmission.

14. The radio node of claim 13, wherein the memory contains further instructions executable by the processing circuitry whereby the radio node is further operative to:
   switch between dynamic and semi-persistent scheduling modes;
   receive a specific DCI for each data transmission received from the transmitting node while in the dynamic scheduling mode; and
   receive the message and the DCI for the semi-persistent scheduling mode.

15. The radio node of claim 13, wherein the duration of the period is an integer number of milliseconds less than 10 milliseconds.

16. The radio node of claim 13, wherein the memory contains further instructions executable by the processing circuitry whereby the radio node is further operative to deactivate HARQ Negative Acknowledgement (NACK) transmission without deactivating HARQ ACK transmission responsive to receiving the message.

* * * * *